Figure 1:
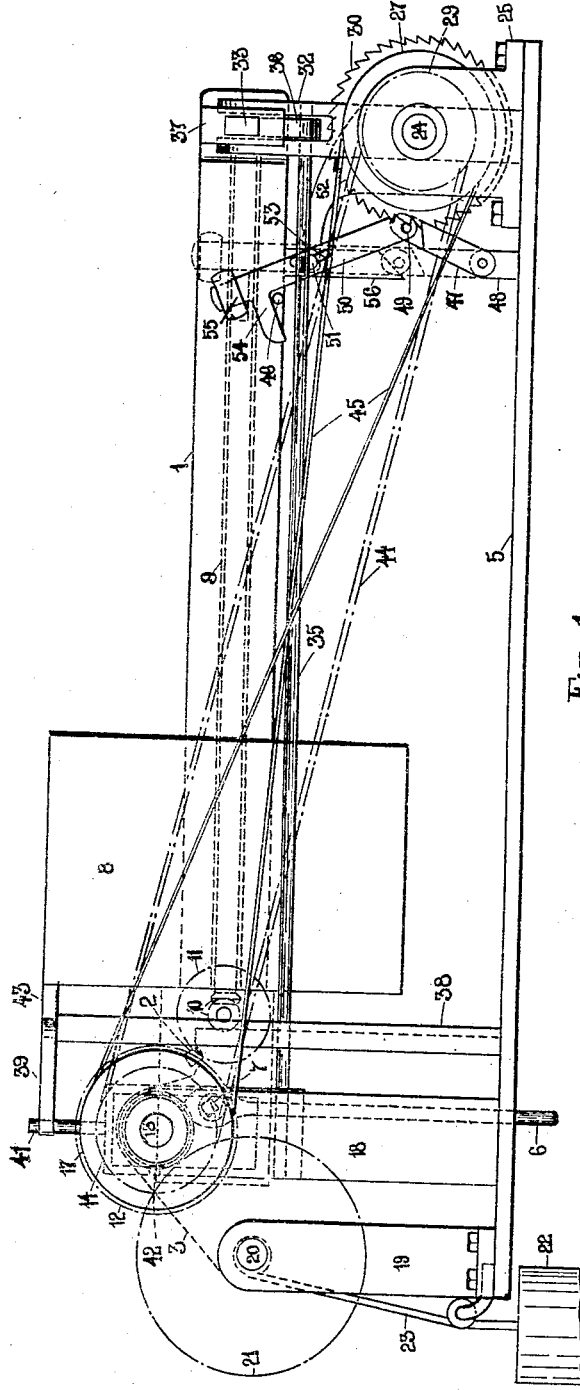

T. ST. J. B. PARNALL.
WEIGHING MACHINE.
APPLICATION FILED JUNE 12, 1907.

904,718.

Patented Nov. 24, 1908.
4 SHEETS—SHEET 1.

Witnesses
Benj. Finckel
Alice B. Cook

Inventor
Thomas St. Julian Babington Parnall
by Fincke & Fincke
his Attorneys

T. ST. J. B. PARNALL.
WEIGHING MACHINE.
APPLICATION FILED JUNE 12, 1907.

904,718.

Patented Nov. 24, 1908.
4 SHEETS—SHEET 2.

Witnesses
Benj. Finckel
Alice B. Cook

Inventor
Thomas St Julian Babington Parnall
by Finckel & Finckel
his Attorneys

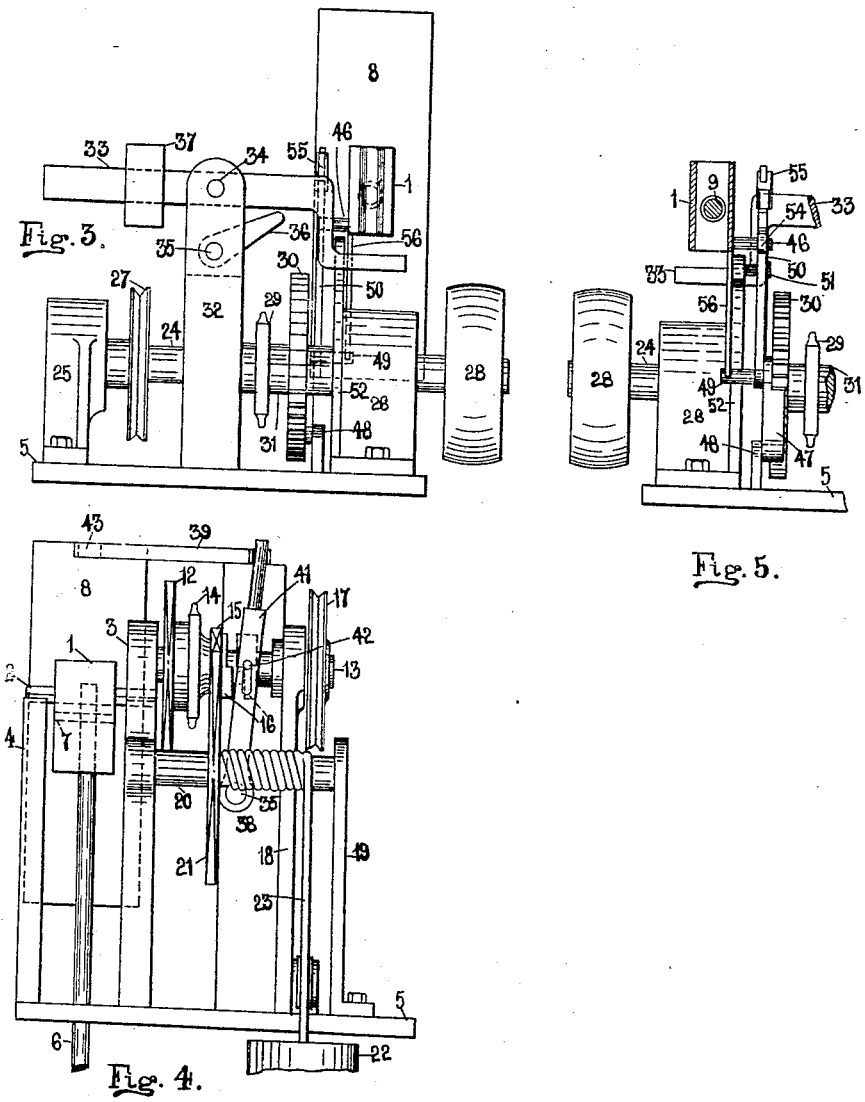

T. ST. J. B. PARNALL.
WEIGHING MACHINE.
APPLICATION FILED JUNE 12, 1907.

No. 904,718.

Patented Nov. 24, 1908.
4 SHEETS—SHEET 4.

Witnesses:
Lillie M. Perry.
C. H. Walker.

Inventor:
Thomas St Julian Babington Parnall
by Finckel & Finckel
Attorneys.

UNITED STATES PATENT OFFICE.

THOMAS ST. JULIAN BABINGTON PARNALL, OF SOHO FOUNDRY, NEAR BIRMINGHAM, ENGLAND, ASSIGNOR OF ONE-HALF TO THE FIRM OF W. & T. AVERY, LIMITED, OF BIRMINGHAM, ENGLAND.

WEIGHING-MACHINE.

No. 904,718.   Specification of Letters Patent.   Patented Nov. 24, 1908.

Application filed June 12, 1907. Serial No. 378,591.

*To all whom it may concern:*

Be it known that I, THOMAS ST. JULIAN BABINGTON PARNALL, a subject of the King of Great Britain and Ireland, residing at Soho Foundry, near Birmingham, in the county of Stafford, England, have invented certain new and useful Improvements in Weighing-Machines, of which the following is a specification.

This invention relates to improvements in the invention for which Letters Patent were granted to be under Number 837,420 dated December 4, 1906, and refers particularly to another means of controlling the poise weight propelling mechanism by the rise and fall of the steelyard.

In the prior invention referred to the rise and fall of the steelyard was communicated directly by a bell crank weighted lever to a clutch for operating the poise weight propelling mechanism in either direction according as the clutch was in gear with one or the other of the two loose contra driven pulleys on the same shaft.

The object of the present invention is to propel the poise weight by means of similar mechanism to that described in the aforesaid Letters Patent controlled by the rise and fall of the steelyard, but to dispense with the sliding clutch on the driving shaft operated through the steelyard. I may however employ a clutch for the return traverse of the poise weight in conjunction with my improved arrangement.

By my present invention the poise weight propelling mechanism is controlled on its forward traverse by the movement of the steelyard independently of the clutch thereby insuring a frictionless control, and consequently a more accurate and sensitive weighing machine.

In one embodiment of the invention the improvement consists in the addition to the shaft from which the poise weight propelling mechanism is driven, of a ratchet wheel that engages with a pawl or the like actuated by the movement of the steelyard, so that when the steelyard is in its normal or lower position the pawl or the like will move into engagement with the ratchet wheel and so prevent any rotation of the poise weight propelling shaft under the action of a falling weight, or other operating means. When the steelyard rises on application of the load, the pawl or like device is removed from contact or engagement with the ratchet wheel and allows the shaft to revolve due to the falling weight or other form of operating means and so propels the poise weight through suitable mechanism as described in the aforesaid Letters Patent.

As hereinbefore mentioned a further improvement consists of a clutch-operated poise weight returning mechanism, which is actuated by the fall of the steelyard, and the return of the poise weight, in such manner as not to affect the sensitiveness of the weighing machine.

Embodiments of the invention will now be described in conjunction with the accompanying drawings, wherein like numerals refer to like parts throughout, but the invention is not confined to the precise forms nor arrangements of the parts shown.

Figure 2:
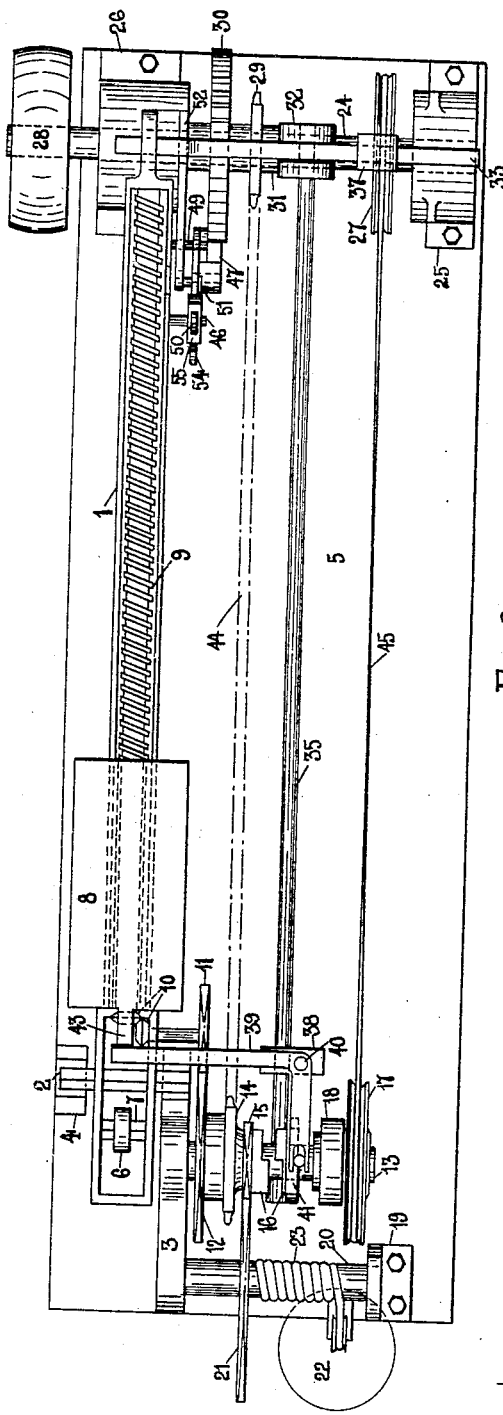
Figure 6:
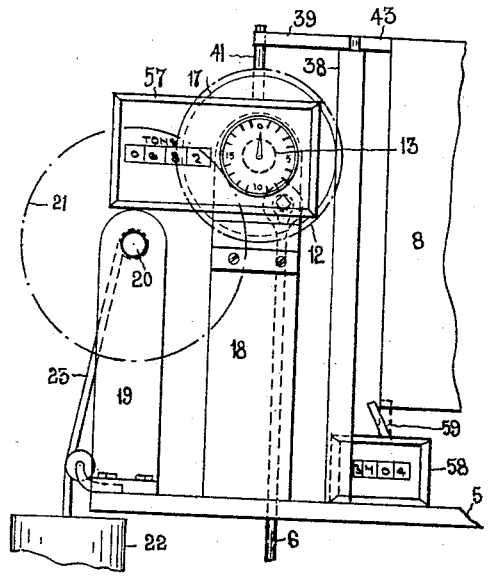
Figure 7:
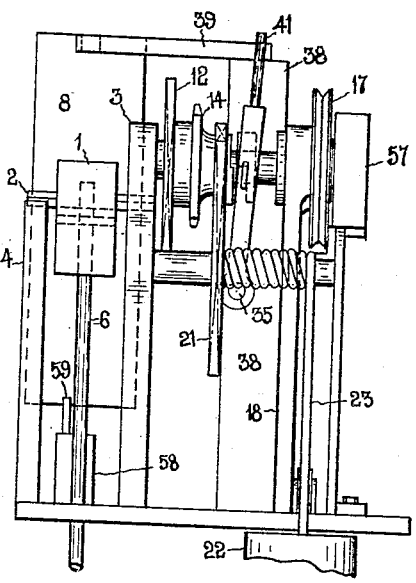
Figure 8:
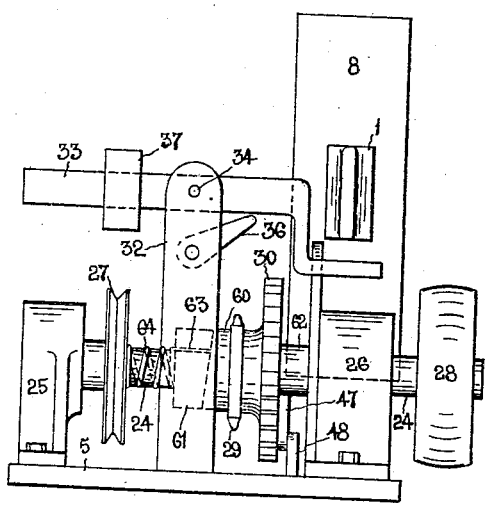
Figure 9:
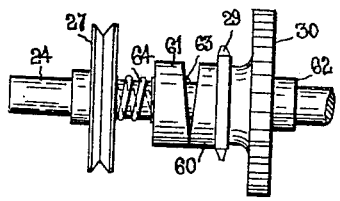

In said drawings, Figure 1 is a side elevation of one arrangement of my invention; Fig. 2 is a plan of same; Fig. 3 is an end view looking on the free end of the steelyard; Fig. 4 is a view looking at the opposite end to Fig. 3; Fig. 5 is a part sectional view of the steelyard showing more clearly the pawl operating mechanism; Fig. 6 is a view of part of Fig. 1 showing counting and recording mechanism attached; Fig. 7 is an end view of Fig. 6, similar to Fig. 4, showing the addition of the counting and recording mechanism; Fig. 8 is an end elevation similar to Fig. 3 but showing a modified form of driving means; and Fig. 9 is a detail of Fig. 8 showing the friction drive in an alternate position.

Referring particularly to Figs. 1 to 5 inclusive, the steelyard 1 is fulcrumed at 2 on bearings 3 and 4, supported on the base 5. The load is communicated to the steelyard through the connecting rod 6 and the knife-edge 7. The particular form of weighing apparatus used in conjunction with the steelyard depends upon the purpose for which the apparatus is to be used, such as a platform machine, weighbridge, or the like, and such apparatus being well known further description is unnecessary.

The steelyard 1 is provided with a sliding weight or poise 8 for the purpose of balancing the load and this poise weight is propelled along the steelyard by means of the screw 9, miter wheels 10, and spur gearing 11, 12, the wheel 12 being mounted on the shaft 13 and the wheel 11 on the steelyard.

Motion is communicated to shaft 13 by means hereafter described. Also mounted on the shaft 13 is a chain wheel 14, toothed wheel 15, clutch 16, and pulley 17. The shaft 13 is carried by the bearings 3 and 18 as shown. Carried by the bearing 3 and a bracket 19 is a supplementary shaft 20 connected with the shaft 13 by the toothed wheel 15 gearing with the toothed wheel 21 on the shaft 20. The shaft 20 supports a weight 22 by means of a rope or other means 23, and motion is communicated to the shafts 13 and 20 by the descent of the weight when released. At the other end of the base plate 5 is a shaft 24 supported by bearings 25 and 26. This shaft is provided with pulleys 27 and 28, chain wheel 29, and ratchet wheel 30, the ratchet wheel and chain wheel being carried on a collar 31, free on the shaft 24.

32 is a forked bracket carrying the lever 33, which is pivoted in the bracket at 34. This bracket also carries a spindle 35 for operating the clutch 16, an arm 36 being fixedly connected therewith as shown in Fig. 3. The lever 33 is provided with a sliding weight 37 for balancing the cranked arm of the lever. The spindle 35 is also carried by the bracket 38, which bracket supports a two-armed lever 39, pivoted at 40, for operating the clutch through the forked lever 41 and pins 42 on the clutch. The two-armed lever 39 is actuated by the projection 43 on the poise weight 8 as will be hereafter described. The chain wheels 14 and 29 are connected by a chain 44, and the pulleys 17 and 27 by a crossed belt 45.

Near the free end of the steelyard is a pin 46 which acts in conjunction with a toggle joint arrangement for causing the engagement and disengagement of the pawl with the ratchet wheel. The pawl 47 forms the lower portion of the toggle joint and is pivotally supported by a bracket 48 on the base plate 5. The pawl portion 47 of the toggle joint is connected with the upper portion or arm 50 by a pin 49, said arm being carried by a pin 51 from a bracket 52. The arm 50 has a slot 53 therein which allows of the arm having movement around the pin 51. Integral with the arm 50 is a projection 54, and at the upper end of this arm is a balance weight 55 for accentuating movement of the toggle joint. Attached to the steelyard and working in conjunction with the pin 49 is a plate 56 having its bottom edge inclined as shown.

It will be obvious that the mechanism may be modified to suit different conditions and requirements without departing from the essential details of my invention, for instance, I could use other poise weight propelling means than that of a falling weight, such as a friction drive between two disks, as illustrated in Figs. 8 and 9. This construction consists of two disks or drums 60 and 61, having inclined faces as shown which can abut against each other. The disk 60 is attached to the chain wheel 29, and through the chain wheel to the ratchet wheel 30, and revolves therewith, all being loose on the shaft 24.

62 is a collar fixed on the shaft 24. The disk or drum 61 is fixed rotatively to the shaft 24 by means of the feather 63, but can move laterally thereon when necessary under the control of a spiral spring 64, one end of which abuts against the pulley 27, and the other end against the outer face of the disk or drum 61.

The apparatus may be used in conjunction with any suitable type of counting, recording or printing mechanism, which is preferably connected by gearing to the shaft 13 as illustrated in Figs. 6 and 7, which show the application to my invention of two types of counting and recording mechanism. As shown in said views, the totalizing counter 57 is connected to the shaft 13. This counter 57 is arranged to be operated through the revolution of said shaft, whereby motion is imparted to the mechanism of the counter, which is arranged to record the forward traverse of the poise weight, thereby totalizing the loads weighed. In order that this counter shall not be affected by the return traverse of the poise weight I may introduce a ratchet and pawl or similar mechanism (not shown) within the counter, whereby only the one direction of revolution of the shaft 13 is recorded.

58 indicates a load counter which is operated by the poise weight. Upon each forward traverse of the poise weight 8 the arm 59 of the load counter assumes the position shown dotted in Fig. 6 under the influence of a spring or the like and on the return of the poise weight to the zero or initial position is caused to assume the inclined position shown by the full lines. This motion of the arm 59 is imparted to the operating mechanism of the counter 58, and thereby records or counts each complete traverse of the poise weight, and therefor each load weighed.

The operation of the apparatus as shown in Figs. 1 to 5 inclusive is as follows: When the mechanism is stationary the parts occupy the position shown in the drawings. The load is now communicated from the platform or other weighing apparatus to the connecting rod 6, which causes the free end of the steelyard 1 to rise together with the pin 46 and plate 56. The pin 46 strikes the under side of the projection 54 in its upward movement thereby straightening the toggle joint, as shown by dotted lines in Fig. 1, the pawl 47 being withdrawn from engagement with the ratchet wheel 30, which allows the ratchet wheel 30, chain wheel 29, and collar 31, to revolve under the influence of the descending weight 22 acting through the shaft 20, wheels 21 and 15, shaft 13, chain wheel 14, and chain 44. The rotation which is thereby transmitted to the shaft 13 under the action of the falling weight revolves also the gear wheel 12, which in turn rotates the wheel 11, miter gearing 10, and screw 9, causing the poise weight 8 to travel along the steelyard. When the poise weight has traversed the steelyard to the point at which it balances the load on the connecting rod 6, the steelyard falls, and by so doing causes the inclined edge of the plate 56 to strike against the pin 49 of the toggle joint, thereby breaking the joint and bringing the pawl 47 into engagement again with the ratchet wheel 30 to prevent further descent of the weight 22 and the rotation of the shafts 13 and 20. When the load has been removed, the steelyard by coming into contact with the cranked end of the lever 33 causes this lever to depress the arm 36 on spindle 35, this imparts a partial rotation to the spindle, which is transmitted through the forked lever 41 with which the spindle 35 is connected (see Fig. 4) to the clutch 16, which movement brings the clutch sections into gear, and by means of a mechanical drive of any suitable kind from the pulley 28, through shaft 24, pulley 27, crossed belt 45, pulley 17, rotates the shaft 13 in a reverse direction to that due to the falling weight, which reverse motion is imparted to the gearing connected with the poise weight and returns same along the steelyard and winds up the weight 22 to its original position, ready for the next operation. The chain wheel 14 during this reverse rotation is free on the shaft 13 and consequently no motion is imparted to the chain 44, which latter is locked against movement by the engagement of the pawl and ratchet on the collar 31. When the poise weight has nearly reached its initial or zero position as shown in Fig. 1, the projections 43 on the poise weight comes into contact with the two-armed lever 39, and moves same about its pivot 40, on the bracket 38. This movement is communicated to the forked lever 41 and thence through the pins 42 to the clutch 16 and the sections of the clutch are thereby uncoupled and the return traverse of the poise weight ceases. The mechanism is now all in its initial position ready for the next application of a load, when the cycle of operation is repeated.

The form of mechanical drive to the pulley 28 is immaterial and may be from any convenient source, this drive in the present arrangement forming no part of the forward traverse of the poise weight, which is entirely under the action of the falling weight 22, and is only employed for the return of the poise weight, and for rewinding the weight 22 to its raised position. It will be obvious that if required this drive may be hand operated, but preferably I employ a continuous mechanical drive, when the machine is required to be automatic. The sliding weights 37 and 55 allow of adjustment and are arranged so that the lever 33 and arm 50 of the toggle joint are readily affected by any contact. By this means I insure that the machine shall be sensitive, and that a minimum of movement of the steelyard shall bring the mechanism into operation.

The operation of the modified form of driving mechanism, as shown in Figs. 8 and 9, is as follows: When the ratchet wheel 30 is free to rotate on the application of the load is hereinbefore described, the mechanical drive through the pulley 28, shaft 24, and rotatively fixed disk or drum 61, is communicated to the ratchet wheel by the friction between the inclined faces of the two disks 60 and 61, due to the spring 64 acting laterally on the disk or drum 61, whereby the chain wheel 29 and ratchet wheel 30 are revolved, and the mechanism operated as previously described in the construction employing a falling weight. When the pawl engages the ratchet wheel on the fall of the steelyard as previously described, the ratchet wheel 30, chain wheel 29, and disk or drum 60, are locked against rotation, and the drive between the inclined faces becomes inoperative, as shown in Fig. 9. This is provided for by the lateral movement possible to the disk or drum 61, which can slide on the feather 63 and compress the spring 64. It will here be observed that though the disk 61 is continuously rotating its rotation is only communicated to the other disk 60 when the same is free to revolve, that is, on application of the load and during the forward traverse of the poise weight.

What I claim is:

1. In a weighing machine, the combination with a steelyard and poise weight movable thereon, of poise weight driving gear, a pawl and ratchet and means for operating the same by the movement of the steelyard to control the operation of the driving gear in one direction, and a clutch operated by the movement of the steelyard for reversing the operation of the driving gear.

2. In a weighing machine, the combination with a steelyard and poise weight movable thereon, of poise weight driving gear and means for operating the same, a pawl and ratchet for controlling the operation of said driving gear in one direction, and a toggle joint lever operated by the movement of the steelyard for engaging and disengaging the pawl and ratchet.

3. In a weighing machine the combination with a steelyard and poise weight movable thereon, of poise weight driving gear and means for operating the same, a pawl and ratchet operated by the movement of the steelyard for controlling the operation of said driving gear in one direction, and automatically controlled means for reversing the operation of the poise weight driving gear.

4. In a weighing machine, the combination with a steelyard and poise weight movable thereon, of poise weight driving gear and means for operating the same, a pawl and ratchet operated by the movement of the steelyard for controlling the operation of said driving gear in one direction, and means operated by the movement of the steelyard for reversing the operation of the poise weight driving gear.

5. In a weighing machine, the combination with a steelyard and poise weight movable thereon, of poise weight drivng gear and means for operating the same in one direction, a pawl and ratchet in operative connection with the steelyard for controlling said gear operating means, means for operating said driving gear in the opposite direction, and a clutch in operative connection with the steelyard for controlling said last mentioned means.

6. In a weighing machine, the combination with a steelyard and poise weight movable thereon, of poise weight driving gear and a power storing device for operating the same in one direction, means for controlling the operation of the power storing device, means for operating the driving gear in the opposite direction and storing power in the power storing device, and automatically operative mechanism for controlling said last mentioned means.

7. In a weighing machine, the combination with a steelyard and poise weight movable thereon, of poise weight driving gear and a power storing device for operating the same in one direction, means in operative connection with the steelyard for controlling the operation of the power storing device, means for operating said driving gear in the opposite direction and storing power in the power storing device, and means in operative connection with the steelyard for controlling the operation of said last mentioned means.

8. In a weighing machine, the combination with a steelyard and poise weight movable thereon, of poise weight driving gear and a power storing device for operating the same in one direction, a pawl and ratchet in operative connection with the steelyard for controlling the operation of the power storing device, means for operating the driving gear in the opposite direction and storing power in the power storing device, and a clutch in operative connection with the steelyard for controlling the operation of said last mentioned means.

9. In a weighing machine, the combination with a steelyard and poise weight movable thereon, of poise weight driving gear and a power storing device for operating the same in one direction, means for locking the power storing device in operative position, means in operative connection with the steelyard for releasing said locking means, means for operating said driving gear in the opposite direction and storing power in the power storing device, and means in operative connection with the steelyard for controlling the operation of said last mentioned means.

10. In a weighing machine, the combination with a steelyard and poise weight movable thereon, of poise weight driving gear, a clutch for controlling the operation of said driving gear in one direction, means for operating the clutch in one direction by the movement of the steelyard, and means actuated by the poise weight for operating the clutch in the opposite direction.

11. In a weighing machine, the combination with a steelyard and poise weight movable thereon, of poise weight driving gear, a power storing device for operating the driving gear in one direction, a pawl and ratchet operated by the movement of the steelyard for controlling the operation of the power storing device, means for operating the driving gear in the opposite direction and storing power in the power storing device, a clutch for controlling the operation of said last mentioned means for operating the clutch in one direction by the steelyard, and means actuated by the poise weight for operating the clutch in the opposite direction.

12. In a weighing machine, the combination with a steelyard and poise weight movable thereon, of poise weight driving gear and means for operating the same, a pawl and ratchet and means for controlling the same by the movement of the steelyard for controlling the operation of said driving gear in one direction, means for reversing the operation of said driving gear, weight recording mechanism operatively connected with said driving gear, and load counting mechanism and means for operating the same by the return movement of the poise weight.

In testimony whereof I affix my signature in presence of two witnesses.

THOMAS ST. JULIAN BABINGTON PARNALL.

Witnesses:
GEORGE E. FOLKES,
HENRY W. WELSH.